H. C. EGERTON.
ACOUSTIC DEVICE.
APPLICATION FILED AUG. 14, 1918.
1,383,700.
Patented July 5, 1921.
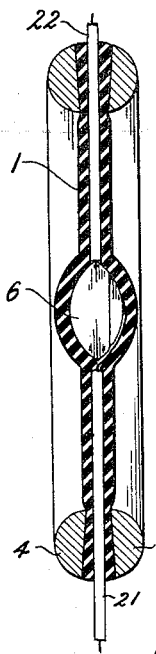
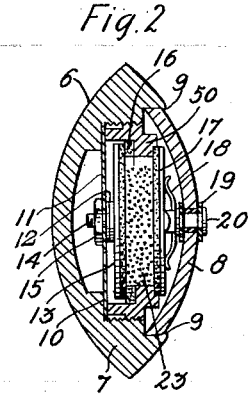
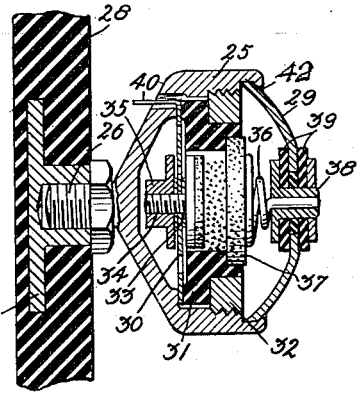
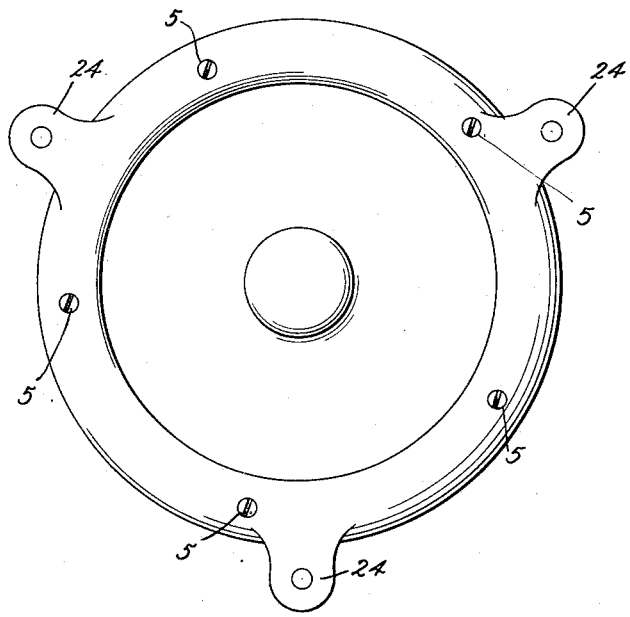
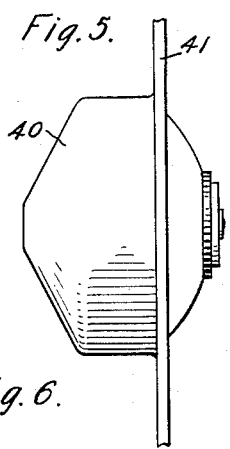
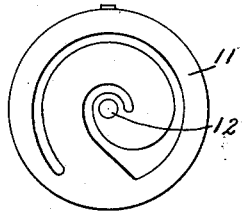
Inventor:
Henry C. Egerton.
by J. E. Roberts Att'y.

UNITED STATES PATENT OFFICE.

HENRY C. EGERTON, OF RIDGEWOOD, NEW JERSEY, ASSIGNOR TO WESTERN ELECTRIC COMPANY, INCORPORATED, OF NEW YORK, N. Y., A CORPORATION OF NEW YORK.

ACOUSTIC DEVICE.

1,383,700. Specification of Letters Patent. Patented July 5, 1921.

Application filed August 14, 1918. Serial No. 249,837.

*To all whom it may concern:*

Be it known that I, HENRY C. EGERTON, a citizen of the United States, residing at Ridgewood, in the county of Bergen, State of New Jersey, have invented certain new and useful Improvements in Acoustic Devices, of which the following is a full, clear, concise, and exact description.

The invention relates to an acoustic device, and more particularly to a device of this character generally known as a telephone transmitter, although it may be used for a variety of other purposes.

In the preferred embodiment of the invention the device takes the form of what is known in the art as a granular carbon microphonic button in which a variable resistance material is included between a pair of electrodes forming the terminals of an electrical circuit, and movement is imparted to one or both of said electrodes due to sound vibrations. Such movement results in setting up corresponding variations in the resistance of an electrical circuit including the electrodes. However, the construction of the invention is equally applicable to devices in which the relative movements between two members caused by sound or other vibrations is utilized to vary the capacity or the inductance of an electrical circuit instead of the resistance thereof.

While the device of the invention may be used as a telephone transmitter, it finds its widest application in the field of detection of submarine vessels, and it is particularly designed for under water use. In order to meet the necessary requirements for the successful detection of submarine vessels, it is an object of the invention to provide a device of this character which is very sensitive to feeble vibratory effects, rugged in construction and which is particularly adapted to be embedded in or bodily secured to a sound-responsive body such as a rubber diaphragm or the side of a ship or mine casing.

In order to obtain this object, in accordance with a feature of the invention, the moving system of the device is so mounted as to respond, due to the inertia of such system, to very feeble vibratory effects. This is accomplished by supporting the moving system relative to the sound-receiving body by means of a spiral disk spring member which is arranged to readily yield in a direction transverse to the plane of the disk, and to be quite rigid in a direction in the plane of the disk.

In accordance with another feature of the invention the electrodes and granular carbon are inclosed in a casing which is in form substantially an ellipsoid. This form of casing is particularly adapted to be embedded in a diaphragm or other sound responsive body.

In accordance with still another feature of the invention, an acoustic device is provided which includes a diaphragm, an embedded carbon button and a support for the diaphragm, forming when assembled, a unit which is in the form of a flat disk and which may be readily secured to and interchangeably used with a variety of casings, such as various types of floats and torpedo-shaped casings adapted to be towed either on or below the surface of the water.

These and other features of the invention not specifically referred to above will more clearly appear from the annexed specification and accompanying drawings, in which Figure 1 is a view in partial transverse section of the complete device; Fig. 2 is a view in section of the microphonic button as shown in Fig. 1; Fig. 3 is a plan view of the device shown in Fig. 1; Fig. 4 is a section of a modified form of microphonic button; Fig. 5 is a side elevation of still another form of microphonic button; and Fig. 6 is a plan view of a spiral disk spring member which is used to support the movable electrode in the buttons disclosed in Figs. 2 and 4.

In the embodiment of the invention illustrated in Figs. 1, 2 and 3, a complete acoustic device is provided which may be handled as a unit and interchangeably used in connection with various forms of floats and towed devices and utilized for the purpose of detecting the presence of a submarine or other vessel at a distant point. The device includes a sound-responsive body or diaphragm 1 which is preferably formed of some yielding energy-absorbing material such as comparatively soft rubber. This diaphragm is supported at its periphery by means of a two-part ring 3 and 4. The diaphragm is assembled between two rings 3 and 4 and is held in place by means of screws 5 passing through the clamping rings and the diaphragm. Embedded in the diaphragm, either during the process of forming the diaphragm or in a depression formed in the diaphragm, is a microphonic button, the casing of which has the form of an ellipsoid. The casing is indicated as a whole at 6 and is shown in detail in Fig. 2. It consists of a cup member 7 and a cover member 8. The cover member is curved so as to preserve the symmetry of the casing, and is held in place by the spun-over edges 9 of the cup. The cup is provided with a circular ledge or shelf 10 which forms a seat for the disk-shaped spring member 11. This spring member is formed of a disk of resilient sheet metal from which a portion is punched to provide a substantially spiral shape tongue 12. The disk is held in place upon the shelf by means of a metallic ring 50 which is threaded into the walls of the cup member and which also forms the side walls of the carbon chamber. The interior of the ring 50 may be coated with insulating material such as shellac. Secured to the end of the tongue 12 is an electrode 13, the stem 14 of which passes through the end of the tongue 12 and is secured by means of the nut 15. The method of securing the electrode stems to the tongue 12 may be varied in practice and in one type of button which has been used, in which the entire button casing is of about one-half inch in diameter and the electrodes slightly over one-eighth inch in diameter, the movable electrode corresponding to that shown at 13 is secured to the tongue 12 by means of solder. The electrode 13, in any case, is of greater diameter than the inner bore of the ring 50, but is separated from the ring 50 by means of a felt washer 16, and is held in contact with such washer by the action of the spring member 11. Supported in a seat formed in the opposite edge of ring member 50 is a second electrode 17. This electrode is held in place by means of a spring 18 which is secured to the cover 8 and which is insulated therefrom by an insulating bushing 19. The spring 18 has considerable stiffness so that when the cover is secured in place there is little or no relative motion possible between the ring 50 and the electrode 17, due to movement of the diaphragm and the button as a whole. Therefore, the electrode 17 may be referred to as the relatively fixed electrode. The spring member 11 possesses considerable resiliency in a direction transverse to the plane of the electrode 15 which is supported thereby, thus permitting a relatively free movement of the electrode along a line perpendicular to its plane. The construction of the spring member 11, however, is such that considerable resistance is afforded against movement of the electrode in the plane of the electrode, or in a plane perpendicular to the axis of the button. The casing is, as before stated, adapted to be embedded in the diaphragm 1, and a leading-in wire 21 also embedded in the diaphragm 1 is connected to the stem 20 of the electrode 17, whereas the leading-in conductor 22, which is also embedded in the diaphragm, is connected through the casing and spring member 11 to the electrode 13. The leading-in conductor 21 is of insulated wire and as the stem of the front electrode 20 is insulated from the casing of the bushing 19, the only conducting path between the electrodes is through the mass of granulated carbon 23 held within the chamber formed by the ring 50, the washer 16 and the carbon surface of the two electrodes.

In use the device is supported on a float, or in a device adapted to be towed either upon or under the surface of the water, by means of the ears 24 formed upon one of the clamping rings. When in position sound waves propagated from a distant point through the water impinging either upon the float or other casing or directly upon the diaphragm 1, cause the diaphragm 1 to vibrate in synchronism therewith. This causes the bodily movement of the microphonic button. Due to the inertia of the movable electrode 13 and the yielding means of supporting such an electrode, these vibrations are reproduced by the movements of such electrode; in other words, the movement of the electrode 13 lags behind that of the diaphragm an amount which is determined by the inertia of the electrode. The relatively fixed electrode 17 however moves with the casing 6 and consequently with the diaphragm so that relative movement is set up between the two electrodes. This movement causes a corresponding compression and release of the mass of carbon granules, and sets up corresponding variations in the resistance of an electric circuit including the electrodes. These variations in turn, through the instrumentality of an ordinary telephone receiver, are transmitted into audible effects which enable the observer to ascertain the presence of a source of sound, and through suitable arrangements utilizing two or more differently positioned acoustic devices, such as described, to locate the direction of such source.

The device of the invention, because of the mounting of the moving system, is very sensitive, and consequently will respond to feeble sound waves or sound waves which have been propagated for long distances. It is important that there should be no movement of the moving system in the plane of the diaphragm; or in other words, it is important that the electrodes should be so arranged as to be capable of movement toward each other and that their movement should be restricted in a direction parallel with the plane of the diaphragm, as such parallel movement will also cause variations in the resistance of the carbon granules and introduce noises in the telephone receiver. This parallel movement between the electrodes is prevented by the construction of the disk spring 11, and this method of supporting the movable electrode is a very important feature of the invention, since acoustic devices which are used for the purpose of detecting the presence of sound under water are subjected to motion in all directions due to the turbulence of the water. Also when the device is used upon a float, the wave motion is a factor which it is necessary to consider.

In the embodiment of the invention disclosed in Fig. 4 the microphonic casing, while for the sake of compactness is also substantially ellipsoid in shape, is particularly adapted to be attached to one side of a diaphragm or other sound-responsive body rather than to be embedded therein. The sound-receiving device may be a float or mine casing and the button may be directly secured to a wall of such mine casing or float. Referring to this construction in detail, the cup member 25 is provided with a stem 26 which is externally threaded to engage an internal thread of a bushing 27 which is embedded or otherwise secured to a diaphragm or wall 28. The cup member 25 is provided with a cover 29 which is secured in place by the spun-over edges 42 of the cup, as in the modification previously described. A disk spring member 30, which is identical in construction with that shown in Fig. 6, is clamped between a circular shelf formed on the inside of the cup and a ring of insulating material 31. This ring of insulating material, which forms the side wall of the carbon chamber, is provided with an annular shoulder which is clamped between a metallic ring 32 and the shelf on the casing 25. Inasmuch as the spring member 30 is interposed between the insulating ring and the shelf of the casing, it is also held in place by means of the ring 32. As shown, the ring 32 is externally threaded and engages an internal thread on the cup 25. In this embodiment of the invention a movable electrode 33 is of slightly smaller diameter than the external bore of the insulating ring 31 and projects within such bore. This electrode is also provided with a stem 34 which is secured by means of the nut 35 to the end of the spiral tongue of the spring member 30. As shown, this nut has considerable mass and is proportioned to counter-balance the electrode 33. Supported from the cover 29 by means of the spiral springs 36 is a relatively fixed electrode 37 which is pressed by such spring against a seat formed in the insulating ring 31. The spiral spring 36, which may be of wire, passes through a metal eyelet 38 to which it is soldered. The eyelet 38 is insulated from the cover 29 and from the casing by insulating material 39. The arrangement is such that after the cover has been assembled, the part of the spring 36 which passes through the eyelet 38 may be utilized to adjust the pressure made by spring 36, and when adjusted may be secured by means of a drop of solder. Connection to the movable electrode is made through the terminal 40 and to the fixed electrode through the spiral spring 36. The operation of this device is the same as that shown in connection with the modification shown in Figs. 1 and 3.

In the embodiment of the invention shown in Fig. 5, the internal construction of the microphone is identical with that of Fig. 4. The casing however differs in that the cup-member 40 is formed as an integral part of the metallic diaphragm 41. Obviously the operation is the same as that of the other two embodiments of the invention.

In actual practice, as incidentally mentioned before, the button when used for the purpose of submarine detection is exceedingly small, the casing rarely exceeding one-half inch in diameter, and in some cases the electrodes are as small as one-eighth inch in diameter. Because of the smallness of the parts and consequently the small amount of inertia possessed by the moving parts, which inertia is dependent upon to vary the resistance of the mass of carbon granules, the device is exceedingly sensitive; and although it is exceedingly sensitive and responds readily to movement, due to sound vibrations which are along the line which is perpendicular to the diaphragm upon which or in which the button is supported, yet the construction of the disk spring is such that the device is comparatively insensitive to movement in a line parallel to the plane of the diaphragm. The device is therefore particularly adapted for use in detecting sounds under water. However, although the device will perhaps find its widest application in submarine detection, it is obvious that acoustic devices connected in accordance with the invention may be utilized for a variety of other places, or in fact may be utilized wherever it is desired to use a very sensitive device of this character.

What is claimed is:

1. An acoustic device comprising a sound responsive body, a current varying device operated therefrom, and a radially inflexible coiled spring connecting said sound responsive body and said current varying device.

2. An acoustic device comprising a sound responsive body, a current varying device operated therefrom, and a spiral disk spring connecting said sound responsive body and said current varying device.

3. An acoustic device comprising a sound responsive body, a current varying device operated therefrom including a movable member and a radially inflexible coiled spring supporting said movable member on said sound responsive body.

4. An acoustic device comprising a sound responsive body, a current varying device comprising a fixed and a movable member mounted thereon, means for supporting said movable member for movement relative to said sound responsive device including a radially inflexible spiral spring whereby motion of said movable member may be produced due to its inertia.

5. An acoustic device comprising a sound responsive body, a cup mounted thereon, a fixed electrode secured to said cup, a second electrode disposed within said cup, a radially inflexible coiled spring adapted to act as a support for said second electrode, and a variable resistance medium included between said electrodes.

6. An acoustic device comprising a sound responsive body, a cup member mounted on said body, a carbon chamber formed in said cup, a fixed electrode forming a closure for one end of the carbon chamber, a second and movable electrode, means for supporting said movable electrode within the carbon chamber comprising a spiral disk spring, and a mass of granular carbon included in said carbon chamber.

7. An acoustic device comprising a sound responsive body, a current varying device mounted thereon comprising a fixed and a movable electrode, and means for supporting said electrodes for relative movement upon said sound responsive device comprising a metallic disk having a spiral tongue of resilient metal formed therein.

8. An acoustic device comprising a fixed electrode, a second electrode movable relative thereto, a resistance varying material included between said electrodes, and means comprising a spiral disk spring yieldingly supporting said movable electrode.

9. In an acoustic device, the combination with a sound responsive body, of a current varying device comprising a cylindrical carbon chamber, a fixed electrode, means for yieldingly holding said fixed electrode against one end of said chamber, a movable electrode, means for supporting said movable electrode within said chamber for movement axially therein, and a variable resistance material included between said electrodes within said cylindrical chamber.

10. In an acoustic device in combination with a sound responsive body and of a current varying device comprising a cup member, a disk supported on a shoulder in said cup member, a tongue formed integral with said disk, a movable electrode supported on the end of said tongue, an annular member also seated in said cup on said disk, a second electrode supported on said annular member, and a variable resistance material included between said electrodes within said annular member.

In witness whereof, I hereunto subscribe my name this 9th day of August A. D., 1918.

HENRY C. EGERTON.